(12) United States Patent
Hayafuji

(10) Patent No.: US 10,057,044 B2
(45) Date of Patent: Aug. 21, 2018

(54) FRONT-END CIRCUIT

(71) Applicant: Murata Manufacturing Co., Ltd., Kyoto (JP)

(72) Inventor: Hisao Hayafuji, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 108 days.

(21) Appl. No.: 14/988,113

(22) Filed: Jan. 5, 2016

(65) Prior Publication Data

US 2016/0127115 A1 May 5, 2016

Related U.S. Application Data

(63) Continuation of application No. PCT/JP2014/065529, filed on Jun. 12, 2014.

(30) Foreign Application Priority Data

Jul. 16, 2013 (JP) .................................. 2013-147379

(51) Int. Cl.
| | |
|---|---|
| *H04L 5/14* | (2006.01) |
| *H04B 1/00* | (2006.01) |
| *H04B 1/10* | (2006.01) |
| *H04B 1/48* | (2006.01) |
| *H04W 72/04* | (2009.01) |

(52) U.S. Cl.
CPC ........... *H04L 5/1461* (2013.01); *H04B 1/006* (2013.01); *H04B 1/0057* (2013.01); *H04B 1/10* (2013.01); *H04B 1/48* (2013.01); *H04W 72/0453* (2013.01)

(58) Field of Classification Search
CPC . H04B 1/10; H04B 1/48; H04B 1/006; H04B 1/0057; H04W 72/0453; H04L 5/1461
See application file for complete search history.

(56) References Cited

U.S. PATENT DOCUMENTS

| | | | |
|---|---|---|---|
| 2002/0045426 | A1 | 4/2002 | Ogi |
| 2004/0032706 | A1 | 2/2004 | Kemmochi |
| 2004/0266378 | A1 | 12/2004 | Fukamachi |

(Continued)

FOREIGN PATENT DOCUMENTS

| | | |
|---|---|---|
| JP | 2002-124890 A | 4/2002 |
| JP | 2003-133989 A | 5/2003 |
| JP | 2006-340257 A | 12/2006 |

(Continued)

OTHER PUBLICATIONS

International Search Report issued in Application No. PCT/JP2014/065529 dated Sep. 16, 2014.

(Continued)

*Primary Examiner* — Jae Y Lee
(74) *Attorney, Agent, or Firm* — Pearne & Gordon LLP

(57) ABSTRACT

A front-end circuit includes a switching circuit and a low-pass filter. The switching circuit includes common terminals and to-be-selected terminals. The common terminals are connected to each other, and a connection point at which the common terminals are connected to each other is connected to an antenna. The common terminal is directly connected to the connection point. The common terminal is connected to the connection point with the low-pass filter interposed there between.

19 Claims, 6 Drawing Sheets

(56) References Cited

U.S. PATENT DOCUMENTS

2006/0276158 A1    12/2006  Okabe

FOREIGN PATENT DOCUMENTS

| | | | | |
|---|---|---|---|---|
| JP | 2007-151181 | * | 6/2007 | ............... H04B 1/44 |
| JP | 2007-151181 A | | 6/2007 | |
| JP | 2012-070267 A | | 4/2012 | |
| JP | 2013-031135 A | | 2/2013 | |
| WO | 2013/003503 A2 | | 1/2013 | |

OTHER PUBLICATIONS

Translation of Written Opinion issued in Application No. PCT/JP2014/065529 dated Sep. 16, 2014.

* cited by examiner

FRONT-END CIRCUIT

BACKGROUND

Technical Field

The present disclosure relates to a front-end circuit that is provided between an antenna and a transmission/reception circuit.

In recent years, front-end circuits each of which is to be used in carrier aggregation that enables simultaneous transmission and reception by using a plurality of frequency bands have been developed. A wireless communication device that includes such a front-end circuit is disclosed in Patent Document 1.

The wireless communication device described in Patent Document 1 includes first to third wireless communication units. The first wireless communication unit and the second wireless communication unit each include a wireless communication circuit and an antenna. The first wireless communication unit and the third wireless communication unit share a portion of the wireless communication circuit included in the first wireless communication unit and the antenna included in the first wireless communication unit. The wireless communication device performs communication using the first or third wireless communication unit and communication using the second wireless communication unit by using different frequency bands. For example, such communications are simultaneously performed while the third wireless communication unit and the second wireless communication unit are respectively using a frequency band of 1.7 GHz and a frequency band of 850 MHz.

Patent Document 1: Japanese Unexamined Patent Application Publication No. 2013-31135

BRIEF SUMMARY

According to Patent Document 1, there is a case where transmission and reception are simultaneously performed while a frequency band of 850 MHz is used for transmission, and a frequency band of 1.7 GHz is used for reception. However, in this case, the second harmonic wave of a transmission signal has a frequency within a reception band, and thus, if the second harmonic wave leaks out to a reception side, there is a possibility that a reception characteristic may deteriorate.

In addition, in the case where a front-end circuit is configured to support a plurality of antennas like Patent Document 1, the size of the front-end circuit increases. On the other hand, in the case where a front-end circuit is configured to support one antenna, when carrier aggregation is performed, the reception characteristic is likely to deteriorate due to a harmonic component (such as the above-mentioned second harmonic wave) of a transmission signal.

The present disclosure provides a small-sized front-end circuit that has an excellent communication characteristic when carrier aggregation is performed.

(1) A front-end circuit according to the present disclosure includes a first switching circuit and a first filter. The first switching circuit includes a plurality of common terminals including first and second common terminals and a plurality of to-be-selected terminals. The first common terminal and the second common terminal are connected to each other, and a connection point at which the first common terminal and the second common terminal are connected to each other is connected to an antenna. The first common terminal is directly connected to the connection point. The second common terminal is connected to the connection point with the first filter interposed between the second common terminal and the connection point.

With this configuration, when transmission signals are input from the to-be-selected terminals of the first switching circuit, harmonic components of the transmission signals are reduced by the first filter. Thus, when carrier aggregation is performed, an excellent reception characteristic can be obtained.

In addition, since the reception characteristic is less likely to deteriorate, while ensuring a good reception characteristic when carrier aggregation is performed, the front-end circuit can be configured to support one antenna. Therefore, the size of the front-end circuit can be reduced.

(2) The front-end circuit according to the present disclosure can be configured as below. The front-end circuit includes a first impedance element. When the second common terminal is connected to the first impedance element, the side on which the first filter is present is opened when viewed from the connection point.

In the case where the first filter is not necessary, the second common terminal is connected to the first impedance element. As a result, a communication signal will not propagate to the first filter, and thus, transmission loss can be reduced.

(3) The first impedance element may be disposed in the first switching circuit.

(4) The first impedance element may be disposed outside the first switching circuit.

(5) The first filter can be a low-pass filter.

(6) The front-end circuit according to the present disclosure can be configured as below. The front-end circuit includes a duplexer that includes a third common terminal and first and second individual terminals. As used herein, the term duplex means the simultaneous transmission of signals in opposite directions, the combination of signals (as with multiplexing), and division of signals (as with demultiplexing). The third common terminal is connected to the antenna. The first individual terminal is connected to the connection point.

With this configuration, separation of communication signals from each other can be performed, and thus, the number of frequency bands that are allocated to the front-end circuit can be increased. In addition, harmonic components of a transmission signals input from the to-be-selected terminals of the first switching circuit are further reduced by the duplexer.

(7) The front-end circuit according to the present disclosure can include a second switching circuit that is connected to the second individual terminal.

(8) The front-end circuit according to the present disclosure can be configured as below. The front-end circuit includes a second filter. The second switching circuit includes a plurality of common terminals including fourth and fifth common terminals and a plurality of to-be-selected terminals. The fourth common terminal is directly connected to the second individual terminal. The fifth common terminal is connected to the second individual terminal with the second filter interposed therebetween.

With this configuration, even if a transmission signal input from a transmission side (the side on which the to-be-selected terminals of the first switching circuit are present) leaks out to the second individual terminal of the duplexer, the leaked transmission signal is removed by the second filter. Thus, the transmission signal can be prevented from leaking out to a reception side (the side on which the to-be-selected terminals of the second switching circuit are present). As a result, when carrier aggregation is performed, a more excellent reception characteristic can be obtained.

(9) The front-end circuit according to the present disclosure can be configured as below. The front-end circuit includes a second impedance element. When the fifth common terminal is connected to the second impedance element, the side on which the second filter is present is opened when viewed from the second individual terminal.

(10) The second filter can be a high-pass filter.

(11) A pass band between the third common terminal and the first individual terminal can be closer to a low-frequency side than a pass band between the third common terminal and the second individual terminal.

(12) The front-end circuit according to the present disclosure can be configured as below. A first switching circuit that is included in the to-be-selected terminals of the first switching circuit is connected to a first transmission port or a first reception port. A second to-be-selected terminal that is included in the to-be-selected terminals of the second switching circuit is connected to a second transmission port or a second reception port. When the second common terminal is connected to the first to-be-selected terminal, the fifth common terminal is connected to the second to-be-selected terminal.

(13) The front-end circuit according to the present disclosure can be configured as below. The first to-be-selected terminal is connected to the first transmission port. The second to-be-selected terminal is connected to the second reception port. The frequency of a harmonic while a transmission signal transmitted from the first transmission port is a fundamental wave is within a reception band corresponding to the second reception port.

According to the present disclosure, when carrier aggregation is performed, an excellent communication characteristic for communication signals to be subjected to the carrier aggregation can be obtained. In addition, a reduction in the size of a front-end circuit can be achieved.

DESCRIPTION OF EMBODIMENTS

First Embodiment

Figure 1:
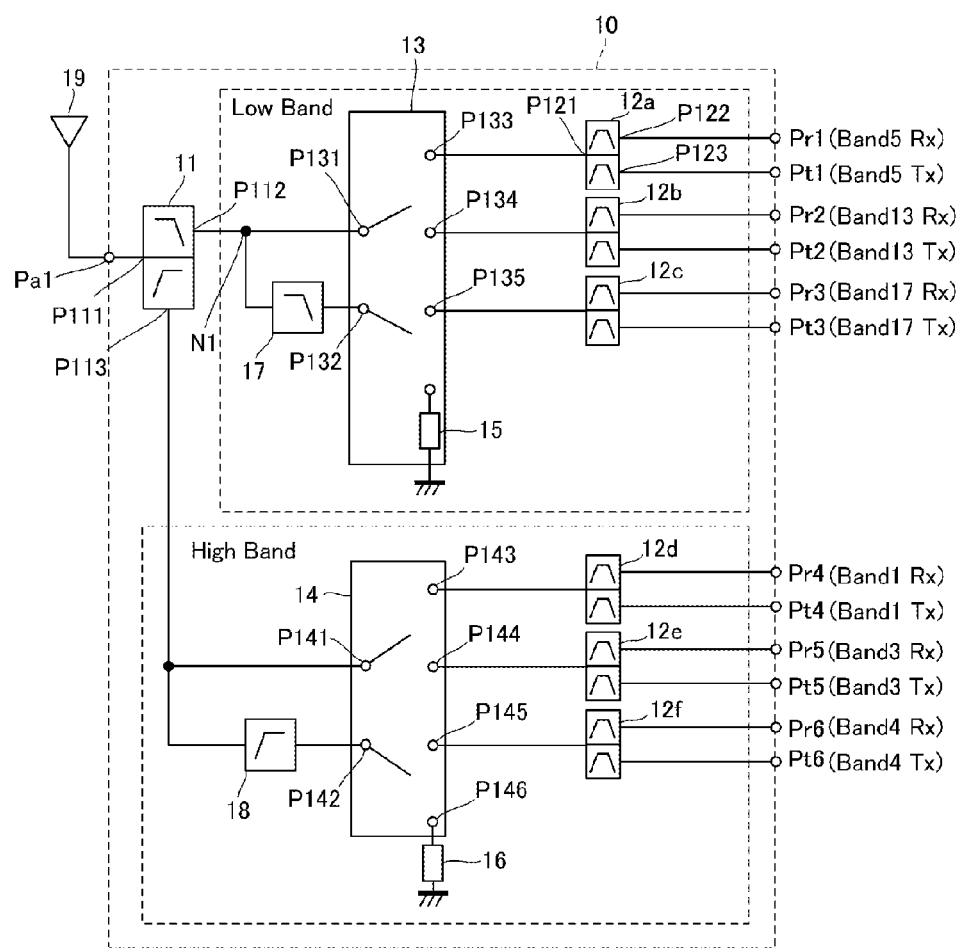
FIG. 1 is a block diagram illustrating a front-end circuit 10 according to a first embodiment.

A front-end circuit according to a first embodiment of the present disclosure will be described. FIG. 1 is a block diagram illustrating a front-end circuit 10 according to the first embodiment. The front-end circuit 10 includes an antenna port Pa1, transmission ports Pt1 to Pt6, and reception ports Pr1 to Pr6. The antenna port Pa1 is connected to an antenna 19. The transmission ports Pt1 to Pt6 are connected to a transmission circuit (not illustrated). The reception ports Pr1 to Pr6 are connected to a reception circuit (not illustrated).

Each of the transmission ports Pt1 to Pt3 corresponds to a first transmission port according to the present disclosure. Each of the transmission ports Pt4 to Pt6 corresponds to a second transmission port according to the present disclosure. Each of the reception ports Pr1 to Pr3 corresponds to a first reception port according to the present disclosure. Each of the reception ports Pr4 to Pr6 corresponds to a second reception port according to the present disclosure.

The transmission ports Pt1 to Pt3 and the reception ports Pr1 to Pr3 support a low band. The transmission ports Pt4 to Pt6 and the reception ports Pr4 to Pr6 support a high band. For example, the low band is a communication signal band of 1 GHz or lower, and the high band is a communication signal band of 1.7 GHz or higher.

In addition, the transmission ports and the reception ports support the frequency bands of long-term evolution (LTE), which is a communication standard. The transmission port Pt1 and the reception port Pr1 correspond to a band 5, the transmission port Pt2 and the reception port Pr2 correspond to a band 13, and the transmission port Pt3 and the reception port Pr3 correspond to a band 17. The transmission port Pt4 and the reception port Pr4 correspond to a band 1, the transmission port Pt5 and the reception port Pr5 correspond to a band 3, and the transmission port Pt6 and the reception port Pr6 correspond to a band 4.

Note that the corresponding relationships between the transmission ports and the reception ports and the bands are not limited to the above. In addition, the transmission ports and the reception ports need not conform to the LTE standard as long as they support an arbitrary frequency band in which a transmission band and a reception band are defined.

The front-end circuit 10 further includes duplexers 11 and 12a to 12f, switching circuits 13 and 14, impedance elements 15 and 16, a low-pass filter 17, and a high-pass filter 18. The duplexer 11 corresponds to a duplexer according to the present disclosure. The switching circuit 13 corresponds to a first switching circuit according to the present disclosure. The switching circuit 14 corresponds to a second switching circuit according to the present disclosure. The impedance element 15 corresponds to a first impedance element according to the present disclosure. The impedance element 16 corresponds to a second impedance element according to the present disclosure. The low-pass filter 17 corresponds to a first filter according to the present disclosure. The high-pass filter 18 corresponds to a second filter according to the present disclosure.

The duplexer 11 includes a common terminal P111 and individual terminals P112 and P113. The duplexer 12a includes a common terminal P121 and individual terminals P122 and P123. Similar to the duplexer 12a, the duplexers 12b to 12f each include a common terminal and individual terminals. The switching circuit 13 is a double-pole, triple-throw (DP3T) switch and includes common terminals P131 and P132 and to-be-selected terminals P133 to P135. The switching circuit 14 is a double-pole, quadruple-throw (DP4T) switch and includes common terminals P141 and P142 and to-be-selected terminals P143 to P146.

The common terminal P131 corresponds to a first common terminal according to the present disclosure. The common terminal P132 corresponds to a second common terminal according to the present disclosure. The common terminal P111 corresponds to a third common terminal according to the present disclosure. The common terminal P141 corresponds to a fourth common terminal according to the present disclosure. The common terminal P142 corresponds to a fifth common terminal according to the present disclosure. The individual terminal P112 corresponds to a first individual terminal according to the present disclosure. The individual terminal P113 corresponds to a second individual terminal according to the present disclosure. The to-be-selected terminals P133 to P135 each correspond to a first to-be-selected terminal according to the present disclosure. The to-be-selected terminals P143 to P145 each correspond to a second to-be-selected terminal according to the present disclosure.

The common terminal P111 of the duplexer 11 is connected to the antenna port Pa1. The individual terminal P112 of the duplexer 11 and the common terminals P131 and P132 of the switching circuit 13 are connected to one another at a connection point N1. The connection point N1 corresponds to "a connection point at which the first common terminal and the second common terminal are connected to each other" according to the present disclosure. The common terminal P131 is directly connected to the connection point N1. The common terminal P132 is connected to the connection point N1 with the low-pass filter 17 interposed therebetween. The impedance element 15 is disposed in the switching circuit 13. Note that the impedance element 15 may be disposed outside the switching circuit 13.

The to-be-selected terminal P133 of the switching circuit 13 is connected to the common terminal P121 of the duplexer 12a. The individual terminal P122 of the duplexer 12a is connected to the reception port Pr1. The individual terminal P123 of the duplexer 12a is connected to the transmission port Pt1. As in the case of the to-be-selected terminal P133 of the switching circuit 13, the to-be-selected terminal P134 of the switching circuit 13 is connected to the transmission port Pt2 and the reception port Pr2 with the duplexer 12b interposed therebetween. The to-be-selected terminal P135 of the switching circuit 13 is connected to the transmission port Pt3 and the reception port Pr3 with the duplexer 12c interposed therebetween.

The individual terminal P113 of the duplexer 11 is directly connected to the common terminal P141 of the switching circuit 14 and is connected to the common terminal P142 of the switching circuit 14 with the high-pass filter 18 interposed therebetween. The to-be-selected terminal P146 of the switching circuit 14 is connected to the impedance element 16. The impedance element 16 is disposed outside the switching circuit 14. Note that the impedance element 16 may be disposed in the switching circuit 14.

As in the case of the to-be-selected terminal P133 of the switching circuit 13, the to-be-selected terminal P143 of the switching circuit 14 is connected to the transmission port Pt4 and the reception port Pr4 with the duplexer 12d interposed therebetween. The to-be-selected terminal P144 of the switching circuit 14 is connected to the transmission port Pt5 and the reception port Pr5 with the duplexer 12e interposed therebetween. The to-be-selected terminal P145 of the switching circuit 14 is connected to the transmission port Pt6 and the reception port Pr6 with the duplexer 12f interposed therebetween.

The common terminal P111 of the duplexer 11 is connected to the individual terminal P112 of the duplexer 11 with a low-pass filter interposed therebetween and to the individual terminal P113 of the duplexer 11 with a high-pass filter interposed therebetween. In the case where a communication signal has a frequency within the low band, the duplexer 11 outputs the communication signal input from the common terminal P111 to the individual terminal P112. In the case where the communication signal has a frequency within the high band, the duplexer 11 outputs the communication signal input from the common terminal P111 to the individual terminal P113. In this manner, the duplexer 11 separates a communication signal of the low band and a communication signal of the high band from each other. In addition, the low-pass filter, which is included in the duplexer 11, reduces a harmonic component of a transmission signal input from the transmission port Pt1, Pt2, or Pt3.

The common terminal P121 of the duplexer 12a is connected to the individual terminals P122 and P123 of the duplexer 12a with band-pass filters interposed therebetween. One of the band-pass filters that is connected between the common terminal P121 and the individual terminal P122 has, as its pass band, the reception band of the frequency band (band 5) corresponding to the reception port Pr1. The other one of the band-pass filters that is connected between the common terminal P121 and the individual terminal P123 has, as its pass band, the transmission band of the frequency band (band 5) corresponding to the transmission port Pt1. Each of the duplexers 12b to 12f has a configuration similar to that of the duplexer 12a.

The common terminal P131 of the switching circuit 13 is connected to one of the to-be-selected terminals P133 to P135 of the switching circuit 13 in accordance with a frequency band used for communication. Note that there is a case where the common terminal P131 is not connected to any of the to-be-selected terminals P133 to P135. The common terminal P132 of the switching circuit 13 is connected to one of the to-be-selected terminals P133 to P135 of the switching circuit 13 or the impedance element 15 in accordance with a frequency band used for communication.

The common terminal P141 of the switching circuit 14 is connected to one of the to-be-selected terminals P143 to P145 of the switching circuit 14 in accordance with a frequency band used for communication. Note that there is a case where the common terminal P141 is not connected to any of the to-be-selected terminals P143 to P145. The common terminal P142 of the switching circuit 14 is connected to one of the to-be-selected terminals P143 to P146 of the switching circuit 14 in accordance with a frequency band used for communication.

When a predetermined communication is performed, the low-pass filter 17 reduces, like the low-pass filter included in the duplexer 11, a harmonic component of a transmission signal input from the transmission port Pt1, Pt2, or Pt3. The harmonic component of the transmission signal can be removed with certainty by the low-pass filter included in the duplexer 11 and the low-pass filter 17.

In the case where the transmission signal input from the transmission port Pt1, Pt2, or Pt3 leaks out to the individual terminal P113 of the duplexer 11, the high-pass filter 18 removes the leaked transmission signal. As a result, the transmission signal can be prevented from leaking out to the reception port Pr2 to Pr6.

Figure 2:
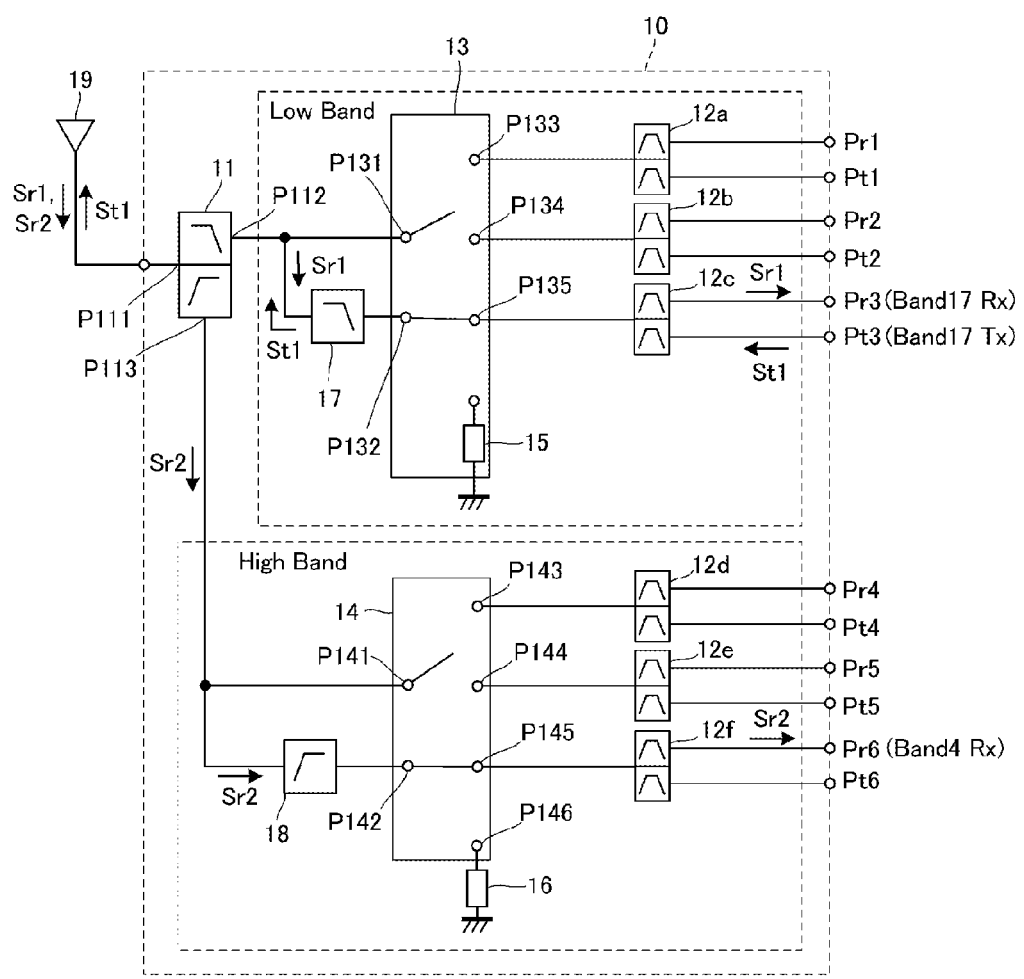
FIG. 2 is a block diagram illustrating a first example of propagation of a communication signal in the front-end circuit 10.

FIG. 2 is a block diagram illustrating a first example of propagation of a communication signal in the front-end circuit 10. FIG. 2 illustrates the propagation of the communication signal when carrier aggregation is performed by using the band 17 for transmission and using the bands 4 and 17 for reception.

In this case, the common terminal P131 of the switching circuit 13 is not connected to any of the to-be-selected terminals P133 to P135 of the switching circuit 13. The common terminal P132 of the switching circuit 13 is connected to the to-be-selected terminal P135 of the switching circuit 13. The common terminal P141 of the switching circuit 14 is not connected to any of the to-be-selected terminals P143 to P146 of the switching circuit 14. The common terminal P142 of the switching circuit 14 is connected to the to-be-selected terminal P145 of the switching circuit 14.

When a transmission signal St1 of the band 17 is input from the transmission port Pt3, the transmission signal St1 passes through the duplexer 12c and propagates to the to-be-selected terminal P135 of the switching circuit 13. The switching circuit 13 outputs the transmission signal St1 input from the to-be-selected terminal P135 to the common terminal P132. The transmission signal St1 output by the switching circuit 13 is transmitted to the low-pass filter 17. The low-pass filter 17 passes the transmission signal St1 and reduces a harmonic component of the transmission signal St1.

The transmission signal St1 output by the low-pass filter 17 is transmitted to the individual terminal P112 of the duplexer 11. The duplexer 11 outputs the transmission signal St1 input from the individual terminal P112 to the common terminal P111 and further reduces the harmonic component of the transmission signal St1. The transmission signal St1 output by the duplexer 11 is transmitted to the antenna 19. The antenna 19 outputs the transmission signal St1.

Since the third harmonic wave of the transmission signal St1 has a frequency within the reception band of the band 4, in the case where the third harmonic wave leaks out to the reception port Pr6, there is a possibility that the reception characteristic in the band 4 may deteriorate to a large extent. However, a high frequency component (such as the third harmonic wave) of the transmission signal St1 is reduced by the low-pass filter 17, after which the high frequency component is further reduced by the low-pass filter included in the duplexer 11. Consequently, the harmonic component of the transmission signal St1 is removed with certainty. Therefore, the probability of the harmonic component leaking out to the reception port Pr6 can be reduced, and accordingly, the probability that the reception characteristic in the band 4 may deteriorate can be reduced.

There is also a case where the transmission signal St1 leaks out to the individual terminal P113 of the duplexer 11. Also in this case, since the leaked transmission signal St1 is removed by the high-pass filter 18, the leaked transmission signal St1 can be prevented from being output to the reception port Pr6.

When a signal of the band 17 is received by the antenna 19, the signal is transmitted to the common terminal P111 of the duplexer 11 as a reception signal Sr1. Since the reception signal Sr1 has a frequency within the low band, the duplexer 11 outputs the reception signal Sr1 input from the common terminal P111 to the individual terminal P112. The reception signal Sr1 output by the duplexer 11 is transmitted to the low-pass filter 17. The low-pass filter 17 passes the reception signal Sr1 and removes external noise and the like. The reception signal Sr1 output by the low-pass filter 17 is transmitted to the common terminal P132 of the switching circuit 13. The switching circuit 13 outputs the reception signal Sr1 input from the common terminal P132 to the to-be-selected terminal P135. The reception signal Sr1 output by the to-be-selected terminal P135 passes through the duplexer 12c and arrives at the reception port Pr3.

When a signal of the band 4 is received by the antenna 19, the signal is transmitted to the common terminal P111 of the duplexer 11 as a reception signal Sr2. Since the reception signal Sr2 has a frequency within the high band, the duplexer 11 outputs the reception signal Sr2 input from the common terminal P111 to the individual terminal P113. The reception signal Sr2 output by the duplexer 11 passes through the high-pass filter 18 and is transmitted to the common terminal P142 of the switching circuit 14. The switching circuit 14 outputs the reception signal Sr2 input from the common terminal P142 to the to-be-selected terminal P145. The reception signal Sr1 output by the to-be-selected terminal P135 passes through the duplexer 12f and arrives at the reception port Pr6.

As described above, even in the case of transmitting the signal of the band 17 while simultaneously receiving the signals of the bands 4 and 17, each of the transmission and reception signals can be output to a corresponding one of the reception ports Pr3 and Pr6 and the antenna 19.

In this manner, carrier aggregation can be performed by using the frequency band that belongs to the low band and the frequency band that belongs to the high band. In particular, when carrier aggregation is performed, an excellent reception characteristic can be obtained.

In other words, the transmission signal input from the transmission port Pt1, Pt2, or Pt3 passes through the low-pass filter 17 and then passes through the low-pass filter included in the duplexer 11. In this case, the high frequency component of the transmission signal is reduced by the low-pass filter 17 and then further reduced by the low-pass filter included in the duplexer 11. Therefore, the high frequency component of the transmission signal can be removed with certainty by the two low-pass filters. As a result, the probability that the reception characteristic in the frequency band that belongs the high band may deteriorate can be reduced.

Note that when a communication signal passes through the high-pass filter 18, the strength of the communication signal somewhat decreases. Thus, in the case of employing a configuration that attaches importance to the strength of such a communication signal, the switching circuit 14 may be set such that the communication signal will not pass through the high-pass filter 18. For example, when performing communication by using the band 4, the common terminal P141 of the switching circuit 14 is connected to the to-be-selected terminal P145 of the switching circuit 14, and the common terminal P142 of the switching circuit 14 is connected to the to-be-selected terminal P146 of the switching circuit 14.

Alternatively, carrier aggregation can be performed by using the frequency band that belongs to the low band and the frequency band that belongs to the high band for transmission. For example, carrier aggregation can be performed by using the bands 3 and 5 (see FIG. 1) for transmission and the bands 3 and 5 for reception. In this case, the common terminal P132 of the switching circuit 13 is connected to the to-be-selected terminal P133 of the switching circuit 13. The common terminal P142 of the switching circuit 14 is connected to the to-be-selected terminal P144 of the switching circuit 14. In this case, a transmission signal of the band 3 is reduced by the duplexer 11 and the low-pass filter 17. Accordingly, the probability that the reception characteristic of the band 5 may deteriorate due to intermodulation distortion caused by the transmission signal of the band 3 can be reduced. A transmission signal of the band 5 is reduced by the duplexer 11 and the high-pass filter 18. Accordingly, the probability that the reception characteristic of the band 3 may deteriorate due to intermodulation distortion caused by the transmission signal of the band 5 can be reduced.

Figure 3:
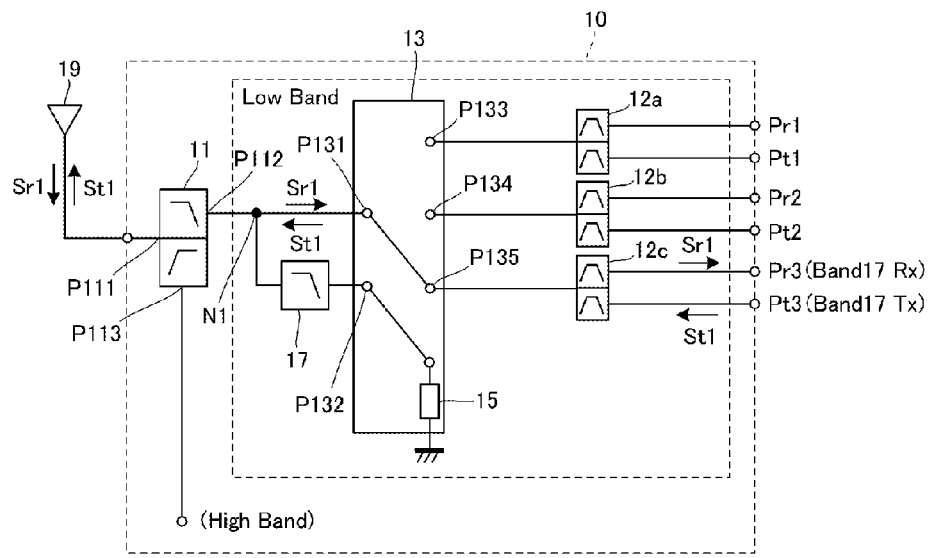
FIG. 3 is a block diagram illustrating a second example of the propagation of the communication signal in the front-end circuit 10.

FIG. 3 is a block diagram illustrating a second example of the propagation of the communication signal in the front-end circuit 10. FIG. 3 illustrates the propagation of the communication signal in the case of performing transmission and reception by using the band 17. In this case, the common terminal P131 of the switching circuit 13 is connected to the to-be-selected terminal P135 of the switching circuit 13. The common terminal P132 of the switching circuit 13 is connected to the impedance element 15.

When the transmission signal St1 of the band 17 is input from the transmission port Pt3, the transmission signal St1 passes through the duplexer 12c and propagates to the to-be-selected terminal P135 of the switching circuit 13. The switching circuit 13 outputs the transmission signal St1 input from the to-be-selected terminal P135 to the common terminal P131.

The impedance element 15 is set such that, when viewed from the connection point N1, the side on which the low-pass filter 17 is present is opened at a frequency within the low band. Thus, the transmission signal St1 output by the switching circuit 13 will not propagate to the low-pass filter 17 and propagates to the individual terminal P112 of the duplexer 11. The duplexer 11 outputs the transmission signal St1 input from the individual terminal P112 to the common terminal P111. The transmission signal St1 output by the duplexer 11 is transmitted to the antenna 19. The antenna 19 outputs the transmission signal St1.

When the signal of the band 17 is received by the antenna 19, the signal is transmitted to the common terminal P111 of the duplexer 11 as the reception signal Sr1. The duplexer 11 outputs the reception signal Sr1 input from the common terminal P111 to the individual terminal P112. As described above, when viewed from the connection point N1, the side on which the low-pass filter 17 is present is opened. Thus, the reception signal Sr1 output by the duplexer 11 will not propagate to the low-pass filter 17 and propagates to the common terminal P131 of the switching circuit 13. The switching circuit 13 outputs the reception signal Sr1 input from the common terminal P131 to the to-be-selected terminal P135. The reception signal Sr1 output by the to-be-selected terminal P135 passes through the duplexer 12c and arrives at the reception port Pr3.

As described above, in the case where the low-pass filter 17 is not necessary, the common terminal P132 of the switching circuit 13 is connected to the impedance element 15. As a result, when viewed from the connection point N1, the side on which the low-pass filter 17 is present is opened, and thus, the communication signal will not propagate to the low-pass filter 17. Therefore, transmission loss between the antenna 19 and each of the transmission ports and each of the reception ports can be reduced. This advantageous effect is particularly useful because the low-pass filter 17 is often not necessary in the case of performing transmission and reception by using one frequency band (when carrier aggregation is not performed).

In the second example, the communication signal will not pass through the low-pass filter 17, and thus, a decrease in the strength of the communication signal can be suppressed.

Note that in the case where the common terminal P142 of the switching circuit 14 (see FIG. 1) is connected to the to-be-selected terminal P146, the impedance element 16 is set such that, when viewed from the duplexer 11, the side on which the high-pass filter 18 is present is opened at a frequency within the high band. Therefore, in the high band, the advantageous effect similar to that described above can be obtained by connecting the common terminal P142 of the switching circuit 14 to the to-be-selected terminal P146.

Figure 4:
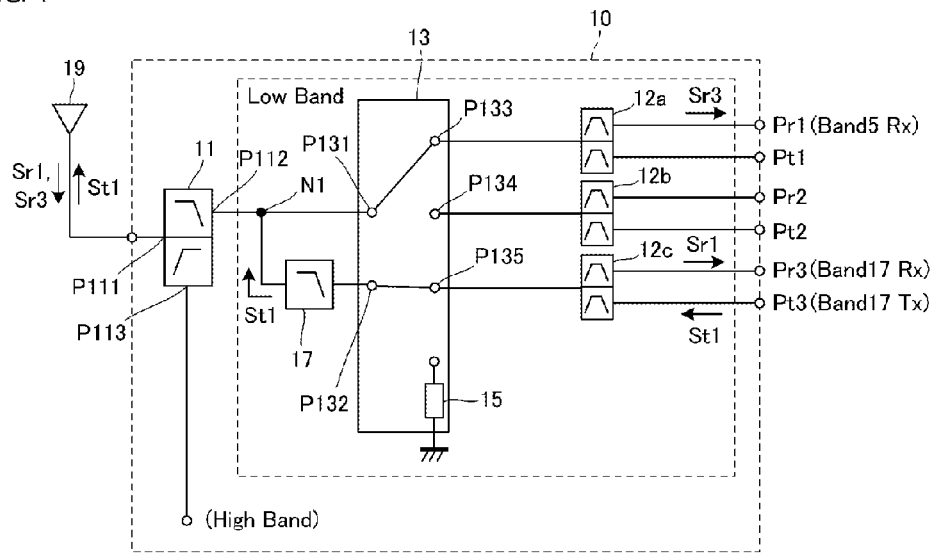
FIG. 4 is a block diagram illustrating a third example of the propagation of the communication signal in the front-end circuit 10.

FIG. 4 is a block diagram illustrating a third example of the propagation of the communication signal in the front-end circuit 10. FIG. 4 illustrates the propagation of the communication signal in the case of performing carrier aggregation by using the band 17 for transmission and the bands 5 and 17 for reception. In this case, the common terminal P131 of the switching circuit 13 is connected to the to-be-selected terminal P133 of the switching circuit 13. The common terminal P132 of the switching circuit 13 is connected to the to-be-selected terminal P135 of the switching circuit 13.

In a similar manner to the above, the transmission signal St1 of the band 17, which has been input from the transmission port Pt3, passes through the duplexer 12c, the switching circuit 13, the low-pass filter 17, and the duplexer 11 and is output by the antenna 19. When the side on which the to-be-selected terminal P133 is present is seen from the connection point N1, the side on which the to-be-selected terminal P133 is present is opened in the transmission band of the band 17 by the duplexer 12a. Thus, the transmission signal St1 will not propagate to the reception port Pr1.

In a similar manner to the above, the reception signal Sr1 of the band 17, which has been received by the antenna 19, passes through the duplexer 11, the low-pass filter 17, the switching circuit 13, and the duplexer 12c and arrives at the reception port Pr3. In a similar manner to the above, a reception signal Sr3 of the band 5, which has been received by the antenna 19, passes through the duplexer 11, the switching circuit 13, and the duplexer 12a and arrives at the reception port Pr1.

In this manner, carrier aggregation can be performed by using the two frequency bands that belong to the low band. Note that carrier aggregation can also be performed by using the two frequency bands that belong to the low band for transmission.

Figure 5:
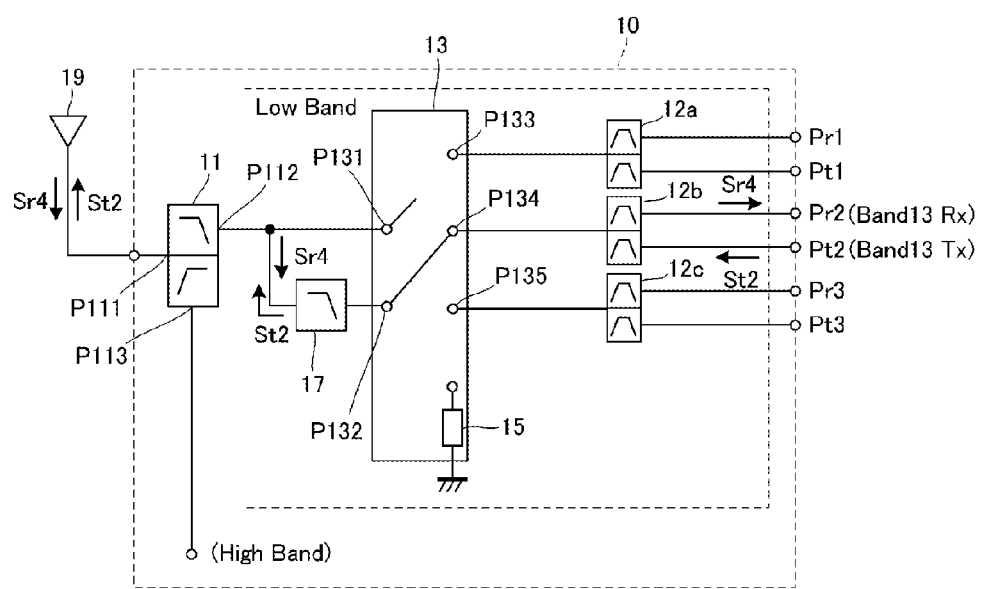
FIG. 5 is a block diagram illustrating a fourth example of the propagation of the communication signal in the front-end circuit 10.

FIG. 5 is a block diagram illustrating a fourth example of the propagation of the communication signal in the front-end circuit 10. In the fourth example, a global positioning system (GPS) receiver (not illustrated) is positioned in the vicinity of the antenna 19. FIG. 5 illustrates the propagation of the communication signal in the case of performing transmission and reception by using the band 13. In this case, the common terminal P131 of the switching circuit 13 is not connected to any of the to-be-selected terminals P133 to P135 of the switching circuit 13. The common terminal P132 of the switching circuit 13 is connected to the to-be-selected terminal P134 of the switching circuit 13.

In a similar manner to the above, a transmission signal St2 of the band 13, which has been input from the transmission port Pt2, passes through the duplexer 12b, the switching circuit 13, the low-pass filter 17, and the duplexer 11 and is output by the antenna 19. In a similar manner to the above, a reception signal Sr4 of the band 13, which has been received by the antenna 19, passes through the duplexer 11, the low-pass filter 17, the switching circuit 13, and the duplexer 12b and arrives at the reception port Pr2.

The frequency of the second harmonic wave of the transmission signal St2 is close to the frequency of a carrier wave that is used in GPS. Thus, in the case where the second harmonic wave is output by the antenna 19, there is a possibility that the reception characteristic of the GPS receiver (not illustrated), which is positioned in the vicinity of the antenna 19, may deteriorate. However, the low-pass filter included in the duplexer 11 and the low-pass filter 17 reduce a harmonic component (such as second harmonic wave) of the transmission signal St2. As a result, the probability of the harmonic component being output by the antenna 19 can be reduced, and accordingly, the probability that the reception characteristic of the GPS receiver may deteriorate can be reduced.

As described above, in the case where carrier aggregation is performed by using one antenna, the reception characteristic is likely to deteriorate due to a harmonic component of a transmission signal. In the first embodiment, the low-pass filter included in the duplexer 11 and the low-pass filter 17 reduce such a harmonic component. Thus, even in the case where carrier aggregation is performed by using one antenna, the reception characteristic is less likely to deteriorate. In other words, while ensuring a good reception characteristic when carrier aggregation is performed, the front-end circuit can be configured to support one antenna. Therefore, compared with the case where the front-end circuit supports a plurality of antennas, the front-end circuit can have a simple configuration. As a result, the size of the front-end circuit can be reduced.

Second Embodiment

Figure 6:
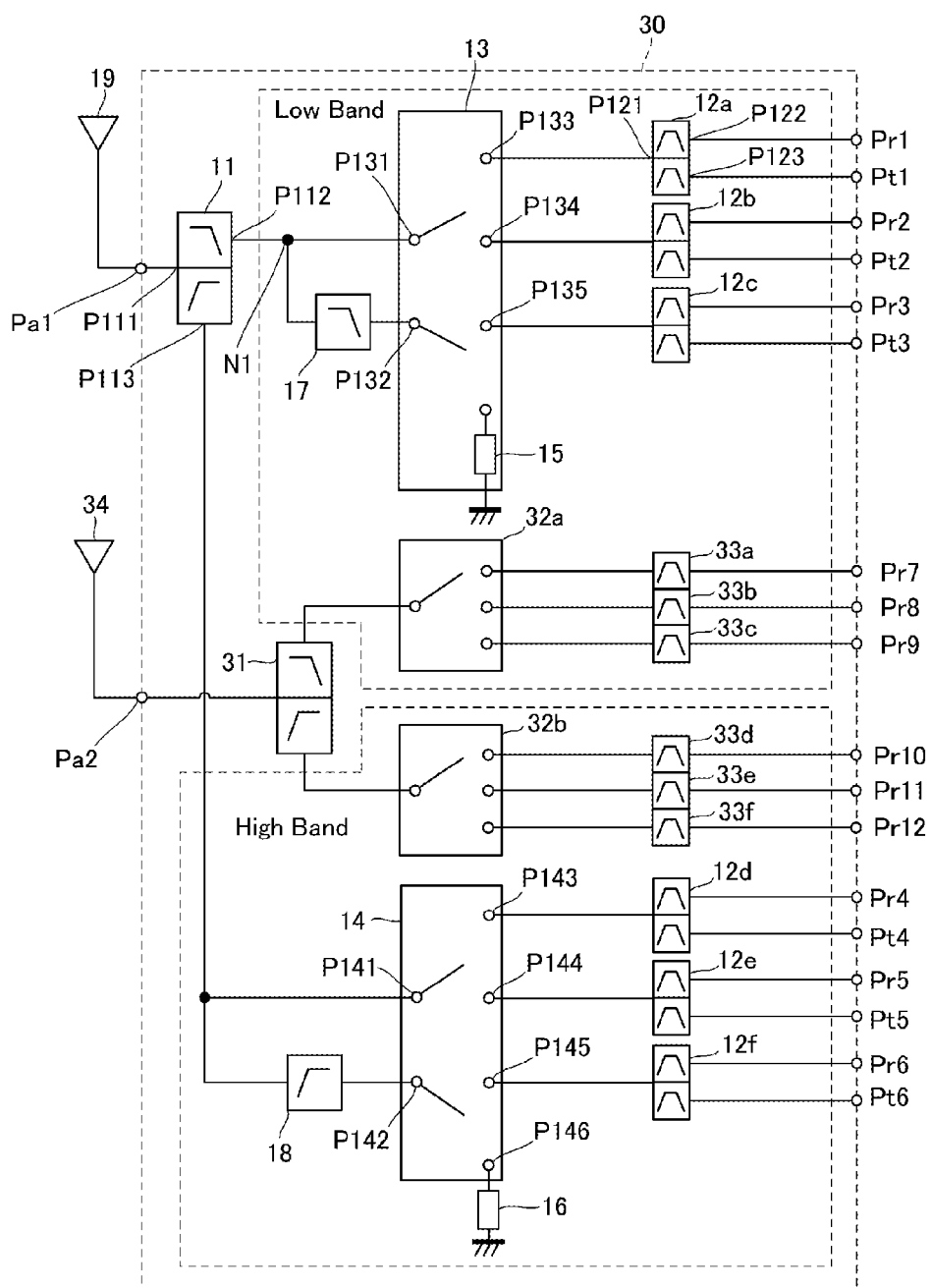
FIG. 6 is a block diagram illustrating a front-end circuit 30 according a second embodiment.

A front-end circuit according to a second embodiment of the present disclosure will now be described. FIG. 6 is a block diagram illustrating a front-end circuit 30 according the second embodiment. The front-end circuit 30 has the configuration according to the first embodiment, and in addition, includes a duplexer 31, switching circuits 32a and 32b, band-pass filters 33a to 33f, an antenna port Pa2, and reception ports Pr7 to Pr12.

The duplexer 31 includes one common terminal and two individual terminals and separates a communication signal of the low band and a communication signal of the high band from each other. Each of the switching circuits 32a and 32b includes one common terminal and three to-be-selected terminals. The reception ports Pr7 to Pr9 correspond to the low band. The reception ports Pr10 to Pr12 correspond to the high band.

The antenna port Pa2 is connected to an antenna 34. The reception ports Pr7 to Pr12 are connected to a reception circuit (not illustrated). The common terminal of the duplexer 31 is connected to the antenna port Pa2. Each of the individual terminals of the duplexer 31 is connected to the common terminal of the switching circuit 32a or the common terminal of the switching circuit 32b. The to-be-selected terminals of the switching circuit 32a are connected to the reception ports Pr7 to Pr9 with the band-pass filters 33a to 33c interposed therebetween. The to-be-selected terminals of the switching circuit 32b are connected to the reception ports Pr10 to Pr12 with the band-pass filters 33d to 33f interposed therebetween.

The rest of the configuration of the second embodiment is similar to that of the first embodiment.

According to the second embodiment, reception using the diversity system can be performed while using the antenna 19 as a main antenna and the antenna 34 as a sub-antenna, respectively. In addition, advantageous effects similar to those of the first embodiment can be obtained.

Third Embodiment

Figure 7:
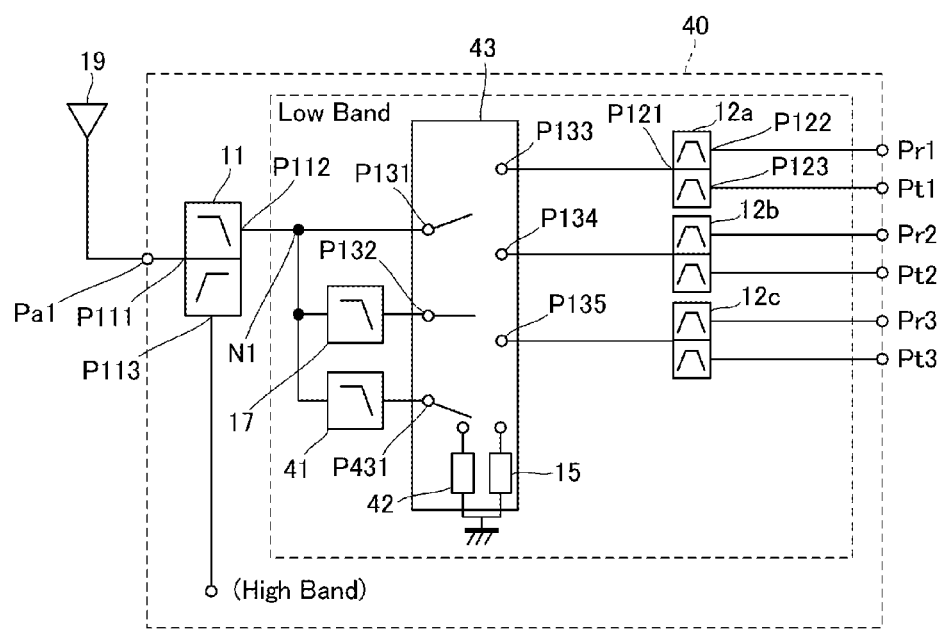
FIG. 7 is a block diagram illustrating a portion of a front-end circuit 40 according to a third embodiment.

A front-end circuit according to a third embodiment of the present disclosure will now be described. FIG. 7 is a block diagram illustrating a portion of a front-end circuit 40 according to the third embodiment. The front-end circuit 40 includes a switching circuit 43 instead of the switching circuit 13 according to the first embodiment. The front-end circuit 40 has the configuration according to the first embodiment, and in addition, includes a low-pass filter 41 and an impedance element 42.

The switching circuit 43 is a triple-pole, triple-throw (3P3T) switch and includes the common terminals P131 and P132, a common terminal P431, and the to-be-selected terminals P133 to P135. The common terminal P431 of the switching circuit 43 is connected to the connection point N1 with the low-pass filter 41 interposed therebetween. The impedance elements 15 and 42 are disposed in the switching circuit 43. The common terminal P132 of the switching circuit 43 is connected to one of the to-be-selected terminals P133 and P134 of the switching circuit 43 or the impedance element 15 in accordance with a frequency band used for communication. The common terminal P431 of the switching circuit 43 is connected to the to-be-selected terminal P135 of the switching circuit 43 or the impedance element 42 in accordance with a frequency band used for communication.

The low-pass filter 17 is set so as to optimally reduce harmonic components of transmission signals input from the transmission ports Pt1 and Pt2. The low-pass filter 41 is set so as to optimally reduce a harmonic component of a transmission signal input from the transmission port Pt3. The impedance element 42 is set such that, when the common terminal P431 is connected to the impedance element 42, the side on which the low-pass filter 41 is present is opened when the side on which the low-pass filter 41 is present is seen from the connection point N1.

The rest of the configuration of the third embodiment is similar to that of the first embodiment.

According to the third embodiment, similar to the first embodiment, carrier aggregation can be performed by using a plurality of frequency bands. In particular, by using the plurality of low-pass filters 17 and 41, the reduction characteristics of the low-pass filters 17 and 41 can be optimally set for each frequency band.

Note that the switching circuit on the low band side may include four or greater common terminals, and low-pass filters each of which corresponds to one of the common terminals may be provided.

In addition, as in the case of the low band side, the switching circuit on the high band side may include three or greater common terminals, and high-pass filters each of which corresponds to one of the common terminals may be provided. As described above, by using a plurality of high-pass filters, the reduction characteristics of the high-pass filters can be optimally set for each frequency band.

REFERENCE SIGNS LIST

N1 connection point
P111 common terminal (third common terminal)
P131 common terminal (first common terminal)
P132 common terminal (second common terminal)
P141 common terminal (fourth common terminal)
P142 common terminal (fifth common terminal)
P121, P431 common terminal
P112 individual terminal (first individual terminal)
P113 individual terminal (second individual terminal)
P122, P123 individual terminal
P133 to P135 to-be-selected terminal (first to-be-selected terminal)
P143 to P145 to-be-selected terminal (second to-be-selected terminal)
P146 to-be-selected terminal
Pa1, Pa2 antenna port Pr1 to Pr3 reception port (first reception port)
Pr4 to Pr6 reception port (second reception port)
Pr7 to Pr12 reception port
Pt1 to Pt3 transmission port (first transmission port)
Pt4 to Pt6 transmission port (second transmission port)
Sr1 to Sr4 reception signal
St1, St2 transmission signal
10, 30, 40 front-end circuit
11, 12a to 12f, 31 duplexer
13 switching circuit (first switching circuit)
14 switching circuit (second switching circuit)
32a, 32b, 43 switching circuit
15 impedance element (first impedance element)
16 impedance element (second impedance element)
42 impedance element
17 low-pass filter (first low-pass filter)
41 low-pass filter
18 high-pass filter
19, 34 antenna
33a to 33f band-pass filter

The invention claimed is:

1. A front-end circuit comprising:
a first switching circuit that includes a plurality of common terminals including first and second common terminals and a plurality of to-be-selected terminals; and
a first filter,
wherein the first common terminal and the second common terminal are connected to each other,
wherein a connection point at which the first common terminal and the second common terminal are connected to each other is connected to an antenna,
wherein the first common terminal is directly connected to the connection point,
wherein the second common terminal is connected to the connection point with the first filter interposed between the second common terminal and the connection point, and
wherein the first common terminal and the second common terminal are independently selectively connected to one of the to-be-selected terminals in accordance with a frequency band of a signal passing through the front-end circuit.

2. The front-end circuit according to claim 1,
further comprising a first impedance element,
wherein, when the second common terminal is connected to the first impedance element, a side on which the first filter is present is opened when viewed from the connection point.

3. The front-end circuit according to claim 2, wherein the first impedance element is disposed in the first switching circuit.

4. The front-end circuit according to claim 2, wherein the first impedance element is disposed outside the first switching circuit.

5. The front-end circuit according to claim 1, wherein the first filter is a low-pass filter.

6. The front-end circuit according to claim 1,
further comprising a duplexer that includes a third common terminal and first and second individual terminals,
wherein the third common terminal is connected to the antenna, and
wherein the first individual terminal is connected to the connection point.

7. The front-end circuit according to claim 6,
wherein a pass band between the third common terminal and the first individual terminal has a lower center frequency than a pass band between the third common terminal and the second individual terminal.

8. The front-end circuit according to claim 6, further comprising a second switching circuit that is connected to the second individual terminal.

9. The front-end circuit according to claim 8, further comprising a second filter,
wherein the second switching circuit includes a plurality of common terminals including fourth and fifth common terminals and a plurality of to-be-selected terminals,
wherein the fourth common terminal is directly connected to the second individual terminal, and
wherein the fifth common terminal is connected to the second individual terminal with the second filter interposed between the fifth common terminal and the second individual terminal.

10. The front-end circuit according to claim 9,
further comprising a second impedance element,
wherein, when the fifth common terminal is connected to the second impedance element, a side on which the second filter is present is opened when viewed from the second individual terminal.

11. The front-end circuit according to claim 10, further comprising:
a second antenna;
a second duplexer that includes a sixth common terminal and third and fourth individual terminals; and
third and fourth switching circuits,
wherein the sixth common terminal is connected to the second antenna, and
wherein the third and fourth individual terminal are connected to the third and fourth switching circuits, respectively.

12. The front-end circuit according to claim 9, wherein the second filter is a high-pass filter.

13. The front-end circuit according to claim 12, further comprising:
a second antenna;
a second duplexer that includes a sixth common terminal and third and fourth individual terminals; and
third and fourth switching circuits,
wherein the sixth common terminal is connected to the second antenna, and
wherein the third and fourth individual terminal are connected to the third and fourth switching circuits, respectively.

14. The front-end circuit according to claim 9,
wherein a first to-be-selected terminal that is included in the to-be-selected terminals of the first switching circuit is connected to a first transmission port or a first reception port,
wherein a second to-be-selected terminal that is included in the to-be-selected terminals of the second switching circuit is connected to a second transmission port or a second reception port, and
wherein, when the second common terminal is connected to the first to-be-selected terminal, the fifth common terminal is connected to the second to-be-selected terminal.

15. The front-end circuit according to claim 14,
wherein the first to-be-selected terminal is connected to the first transmission port,
wherein the second to-be-selected terminal is connected to the second reception port, and
wherein, while a transmission signal transmitted from the first transmission port is a fundamental wave, a frequency of a harmonic is within a reception band corresponding to the second reception port.

16. The front-end circuit according to claim 14, further comprising:
   a second antenna;
   a second duplexer that includes a sixth common terminal and third and fourth individual terminals; and
   third and fourth switching circuits,
   wherein the sixth common terminal is connected to the second antenna, and
   wherein the third and fourth individual terminal are connected to the third and fourth switching circuits, respectively.

17. The front-end circuit according to claim 9, further comprising:
   a second antenna;
   a second duplexer that includes a sixth common terminal and third and fourth individual terminals; and
   third and fourth switching circuits,
   wherein the sixth common terminal is connected to the second antenna, and
   wherein the third and fourth individual terminal are connected to the third and fourth switching circuits, respectively.

18. The front-end circuit according to claim 6, further comprising:
   a second antenna;
   a second duplexer that includes a sixth common terminal and third and fourth individual terminals; and
   third and fourth switching circuits,
   wherein the sixth common terminal is connected to the second antenna, and
   wherein the third and fourth individual terminal are connected to the third and fourth switching circuits, respectively.

19. The front-end circuit according to claim 2, wherein the first filter is a low-pass filter.

* * * * *